Oct. 25, 1960

R. C. LUNDQUIST 2,957,686

CONTINUOUS MINER WITH CONVEYOR HAVING
VERTICALLY ADJUSTABLE SIDE WALLS

Filed March 7, 1958

INVENTOR.
Richard C. Lundquist
BY
Murray A. Gleeson
ATTORNEY

Oct. 25, 1960 R. C. LUNDQUIST 2,957,686
CONTINUOUS MINER WITH CONVEYOR HAVING
VERTICALLY ADJUSTABLE SIDE WALLS
Filed March 7, 1958 4 Sheets-Sheet 2

INVENTOR.
Richard C. Lundquist
BY
Murray A. Gleeson
ATTORNEY

Oct. 25, 1960   R. C. LUNDQUIST   2,957,686
CONTINUOUS MINER WITH CONVEYOR HAVING
VERTICALLY ADJUSTABLE SIDE WALLS
Filed March 7, 1958   4 Sheets-Sheet 3

INVENTOR.
Richard C. Lundquist
BY
Murray A. Gleeson
ATTORNEY

INVENTOR.
Richard C. Lundquist
BY
Murray A. Gleeson
ATTORNEY

United States Patent Office 2,957,686
Patented Oct. 25, 1960

2,957,686

CONTINUOUS MINER WITH CONVEYOR HAVING VERTICALLY ADJUSTABLE SIDE WALLS

Richard C. Lundquist, Chicago, Ill., assignor to Goodman Manufacturing Company, Chicago, Ill., a corporation of Illinois Filed Mar. 7, 1958, Ser. No. 719,785

6 Claims. (Cl. 262—7)

This invention relates to improvements in continuous mining machines of the boring type adapted to cut contiguous bores in advance of the machine and more particularly relates to such machines in which the working height of the machine is variable.

An object of the invention is to provide a continuous mining machine of the boring type, adjustable for varying working heights and having a transversely pivoted pick-up conveyor in which the side walls of the conveyor are automatically increased in height as the working height of the machine is adjusted for cutting in higher seams of coal.

Still another object of the invention is to provide a continuous mining machine of the boring type in which the working height of the machine may be adjusted, and having an inclined pick-up conveyor pivoted to the main frame of the machine, together with a camming operative connection between the adjustable cutter frame of the machine and the conveyor for varying the height of the side wall of the conveyor in accordance with the working height of the machine, and thereby providing side walls of maximum height when the working height of the machine is in its maximum position of vertical adjustment.

These and other objects of the invention will appear from time to time as the following specification proceeds and with reference to the accompanying drawings wherein.

Figure 1:
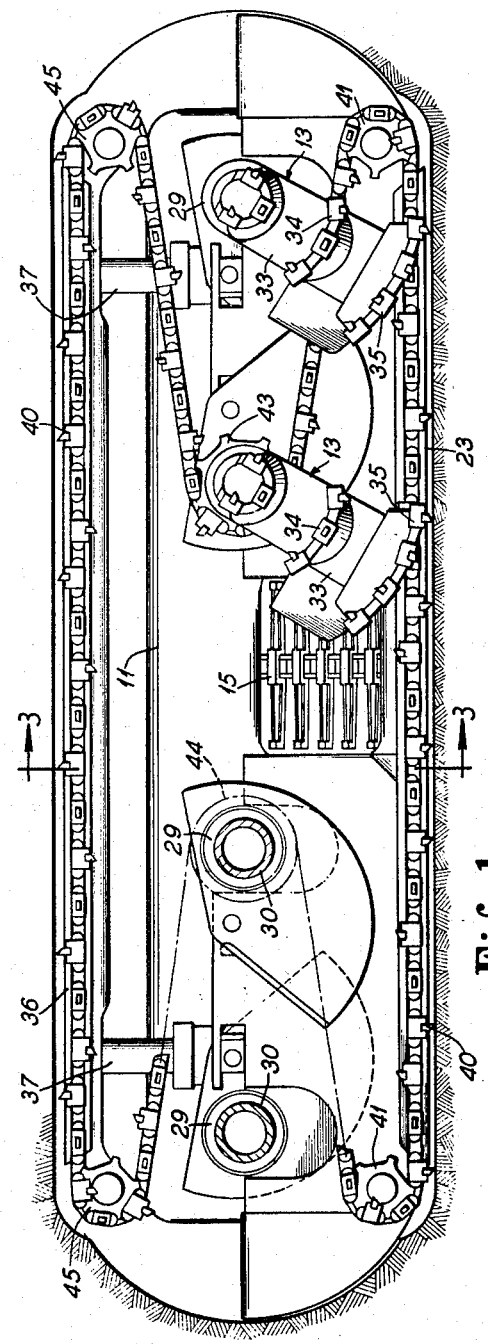
Figure 1 is a front elevational view of a continuous boring type of mining machine constructed in accordance with a preferred embodiment of the invention.

In the embodiment of the invention illustrated in the drawings, 10 generally designates a mobile base frame having a cutter frame 11 supported in advance thereof, for vertical adjustment with respect to the ground and for angular adjustment about axes extending transversely and longitudinally of the main frame 10.

The base frame 10 is supported on laterally spaced continuous traction tread devices 12 which serve to transport the machine along the ground from working place to working place and to feed boring heads 13 mounted on the cutter frame 11 to cut contiguous bores in the working face.

An endless conveyor 15 extends along the main frame 10 from a position adjacent the ground in advance of said main frame and spaced rearwardly of the boring heads 13, in an upwardly inclined direction, and horizontally beyond the rear end of said main frame for loading the mined coal into conveyors, shuttle cars and the like.

Figure 3:
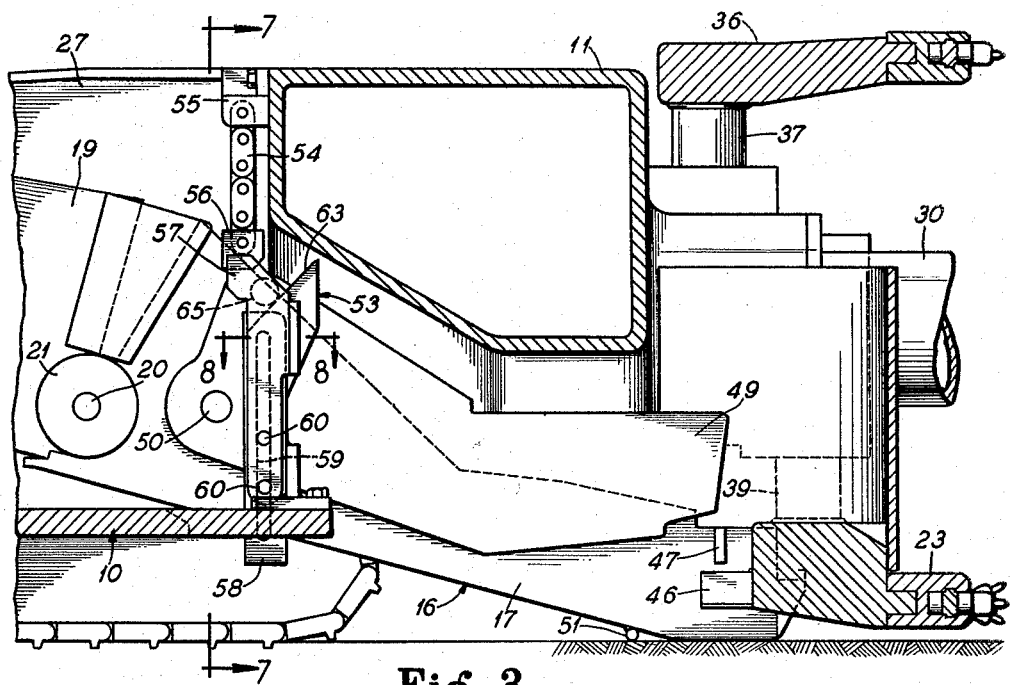
Figure 3 is an enlarged fragmentary longitudinal sectional view of the machine, taken substantially along line 3—3 of Figure 1, showing the machine adjusted for operation at a relatively low working height.
Figure 6:
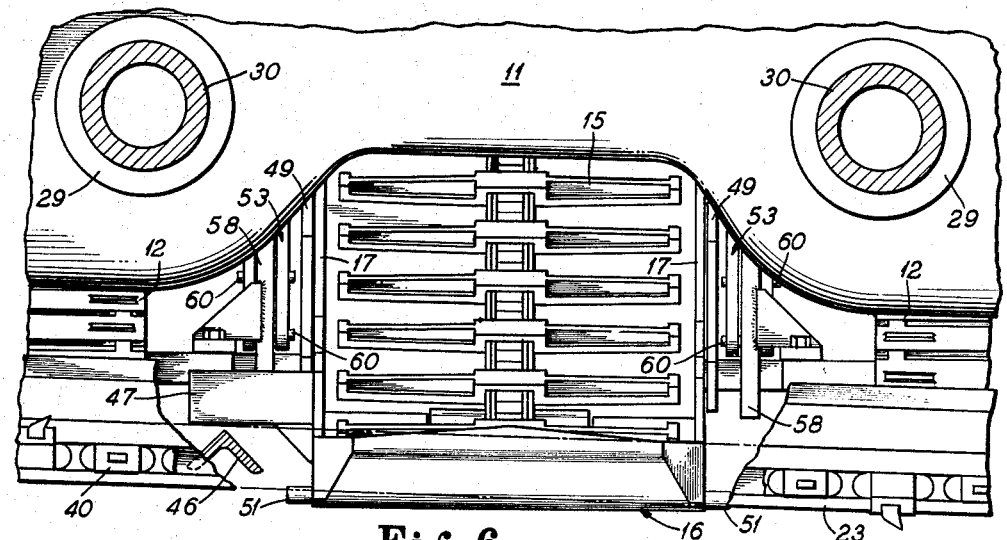
Figure 6 is an enlarged fragmentary forward end view of the machine, with certain parts broken away and certain other parts shown in section showing the cutter bar tilted with respect to the conveyor.

The conveyor 15 is herein shown as being a laterally flexible center strand chain and flight type of conveyor of a well known form, so not herein shown or described further, except as to the construction of the forward pick-up and elevating portion of the conveyor. The pick-up and elevating portion of the conveyor is shown in Figures 3 and 6 as including an inclined box-like frame structure 16 having parallel spaced side walls 17 pivotally connected to the side walls of a rear stationary frame structure 19 of the conveyor on pivot pins 20, mounted on bosses 21 extending laterally from the side walls 19 and projecting forwardly therefrom. The box-like frame structure 16 normally rests on the mine floor during the mining operation and is supported on and elevated by a lower cutter bar 23, as said cutter bar is elevated above the mine floor, to accommodate tramming of the machine in accordance with the principles of the invention, as will hereinafter be more clearly described as this specification proceeds.

Figure 2:
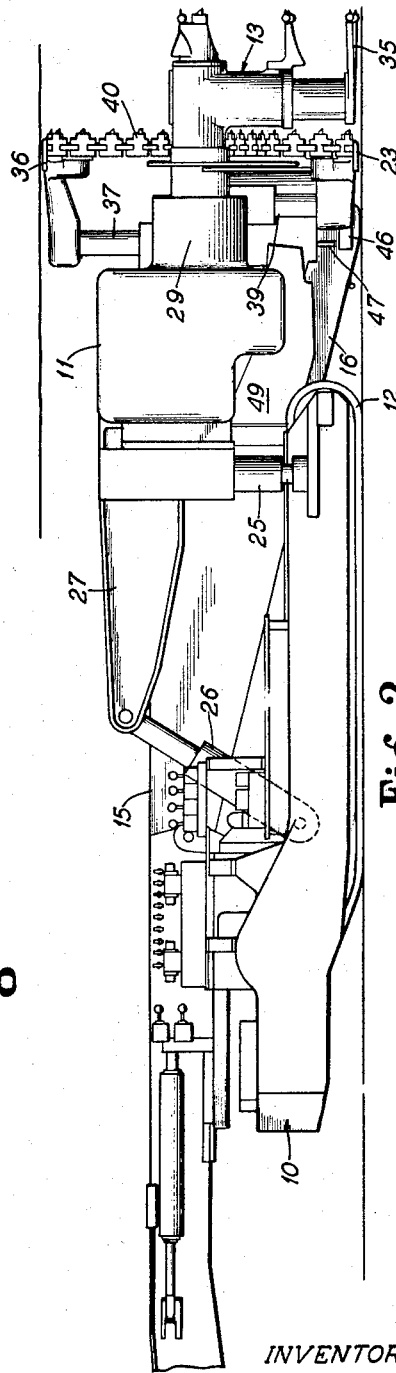
Figure 2 is a view in side elevation of the machine shown in Figure 1.

The cutter frame or gear housing 11 is shown in Figure 2 as being supported on the main frame 10 on a pair of laterally spaced vertically disposed hydraulic jacks 25 in a manner similar to that shown and described in Patent No. 2,757,917 dated August 7, 1956. The hydraulic jacks 25 are located adjacent the opposite rear corners of the cutter frame and have pivotal connections with the main frame 10, as in Patent No. 2,757,917, to elevate the cutter frame 11 and tilt said cutter frame laterally about axes extending longitudinally of the main frame 10.

Limited forward and rear tilting movement of the cutter frame 11 is effected by a pair of hydraulic jacks 26 pivotally connected to the main frame 10 at their lower ends. The hydraulic jacks 26 are normally inclined at forwardly and upwardly extending angles and are connected at their upper ends to arms 27 extending rearwardly of the cutter frame 11, as in the aforementioned Patent No. 2,757,917.

Lateral and vertical tilting adjustments of the cutter frame 11 may thus be effected independently of, or in conjunction with each other by selective control of the hydraulic jacks 25 and 26 respectively, each supplied by hydraulic pressure from a suitable source of supply, under control of conventional valve means, which need not herein be shown or described.

In the illustrative form of the machine shown in Figures 1 and 2, four similar boring heads are shown, which are rotatably mounted in advance of the cutter frame 11 on hubs 29. Two boring heads are shown in Figure 1, the other two boring heads being broken away to show their drive shafts 30. The four boring heads 13, as herein shown, have radial arms 33 having radially spaced arcuate cutters 34 and 35 mounted thereon, the outermost cutter 35 being radially adjustable to adjust the cutter to the desired cutting height of the machine.

The cutter frame 11 also forms a support for an upper cutter or trimmer bar 36, mounted on said cutter frame on laterally spaced hydraulic jacks 37, vertically adjusting said trimmer bar to the required cutting height of the machine. The lower trimmer bar 23 may extend parallel to the upper trimmer bar 36 and is supported on the cutter frame 11 by hydraulic jacks 39, depending from said cutter frame.

The trimmer bars 23 and 36 have the usual cutter chain 40 guided for movement therealong for trimming the upstanding and depending cusps left between the boring heads 13, in a usual manner. The cutter chain 40 is trained about corner sprockets 41 at opposite ends of the trimmer bar 23 and inwardly therefrom, about a drive sprocket 43 at the right hand side of the machine and an idler sprocket 44 adjacent the left hand side of the machine. From the idler sprocket 44 and the drive sprocket 43, the chain is trained outwardly around corner sprockets 45 at opposite ends of the trimmer bar 36 to and along said trimmer bar. A suitable tensioning means may be provided for the chain 40, for properly tensioning the cutter chain 40 in the various positions of adjustment of the trimmer bars 23 and 36 with respect to each other. Said tensioning means may be of any well known construction and is no part of the present invention so need not be shown or described herein.

Referring now in particular to Figures 3 and 6 and the support for the frame section 16 of the conveyor on the cutter bar 23, accommodating free lateral tilting movement of said cutter bar about axes extending longitudinally of the machine and relieving the frame structure 16 from twisting stresses, as the cutter bar is tilted with respect thereto, I have herein shown a knife edge support for the frame 16 on the cutter bar 23 in the form of an angle iron 46, welded or otherwise secured to the rear wall of the lower cutter bar 23, with its apex facing upwardly, for engagement with an ear or projection 47 welded or otherwise secured to the frame structure 16 and extending laterally therefrom.

During the normal cutting operation of the machine, the apex of the angle iron 46 is spaced beneath the undersurface of the ear 47 and the frame structure 16 of the conveyor slidably moves along the ground. As, however, the cutter bar is elevated the apex of the angle iron engaging the undersurface of the ear 47 forms a knife edge support for said conveyor on the cutter bar 23, elevating the conveyor about the axes of the pivot pins 20 and accommodating free lateral tilting movement of the cutter bar 23 about axes extending longitudinally of the machine.

It should be noted with reference to Figures 3, 4, 6 and 7, that during normal operation of the machine clearance is provided between the knife edge support 46 and the ear 47, to permit the box-like frame portion 16 of the conveyor to rest and slidably move along the ground, as the machine is advanced into the material being mined.

As, however, the cutter bar 23 is elevated, the apex of the angle 46 provides a knife edge support for the conveyor accommodating pivotal movement of the cutter bar to permit angular adjustment of the cutter bar and cutter frame 11 without transmitting torsional stresses on the conveyor structure.

It will further be noted from Figure 6 that the ear 47 and the angle 46 are closely adjacent the side of the conveyor to locate the point contact between the cutter bar and conveyor as close to the neutral axis of the machine as possible and that the knife edge support accommodates relative longitudinal movement between the cutter bar and conveyor during vertical adjustment thereof, and thereby avoids the need for a flexible or telescopic frame structure at the front of the conveyor, which has formerly been used where the conveyor is vertically adjustable with the cutter bar.

Referring now to the mechanism for automatically adjusting the height of the side walls 17 of the frame structure 16, in accordance with the selected working heights of the machine, to increase the material retaining capacity of the receiving end portion of the conveyor in accordance with the increased quantity of coal mined, the side walls 17 of the frame structure 16 have vertically adjustable side plates 49 extending therealong. Each side plate 49 is pivoted to a side wall 17 of the frame structure 16 on a transverse pivot pin 50 located adjacent the rear end portion of the side wall 17. The adjustable side plates 49 extend along the side walls 17 from the rear end thereof to a position adjacent the forward end thereof, but spaced sufficiently rearwardly of the ears 47 to accommodate complete retractible movement of the side plates 49 with respect to the side walls 17, as when the machine is in the tramming position shown in Figure 5. Downward movement of the side plates 49 is limited by stops 51, herein shown as being rods welded or otherwise secured to the bottom of the frame structure 16 and extending outwardly beyond the side walls 17 thereof.

The means for vertically moving each side plate 49 comprises an individual cam member 53 for each side plate. The cam members 53 are connected with the cutter frame 11 through flexible connecting members such as lengths of chain 54. Each length of chain 54 is shown as being connected at its upper end to a block 55 extending rearwardly of the cutter frame 11. The lower end of each chain 54 is pivotally connected to an upwardly opening yoke member 56, mounted on an upwardly extending leg portion 57 of the cam member 53.

Figure 8:
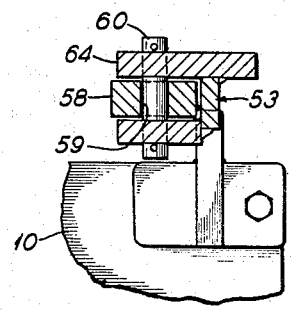
Figure 8 is an enlarged fragmentary horizontal sectional view taken substantially along line 8—8 of Figure 3.
Figure 7:
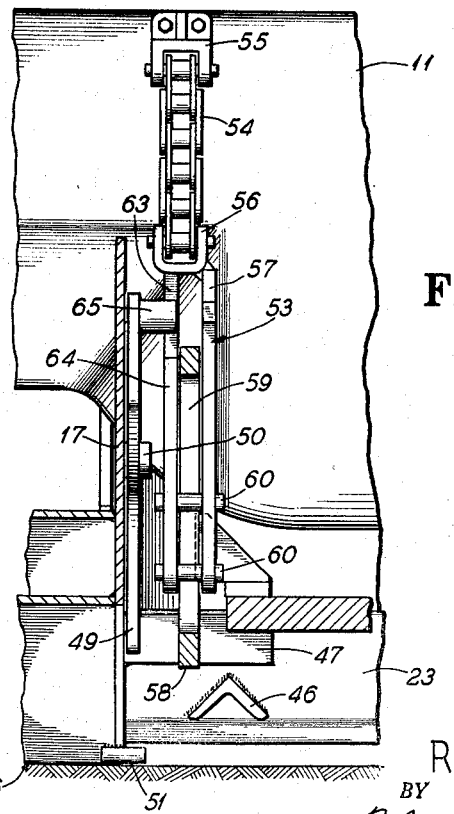
Figure 7 is an enlarged fragmentary sectional view taken substantially along line 7—7 of Figure 3.

The cam member 53 is shown in Figure 8 as being generally U-shaped in horizontal cross-section, and extends along opposite sides of a guide plate 58, mounted on the main frame 11 and extending upwardly therefrom. The guide plate 58 is shown as having a slot 59 extending vertically therealong, slidably engaged by spaced pins 60, mounted in the opposite walls of the cam member 53, for guiding said cam along the plate 58 and retaining said cam from angular movement with respect thereto (Figures 4 and 7).

Figure 5:
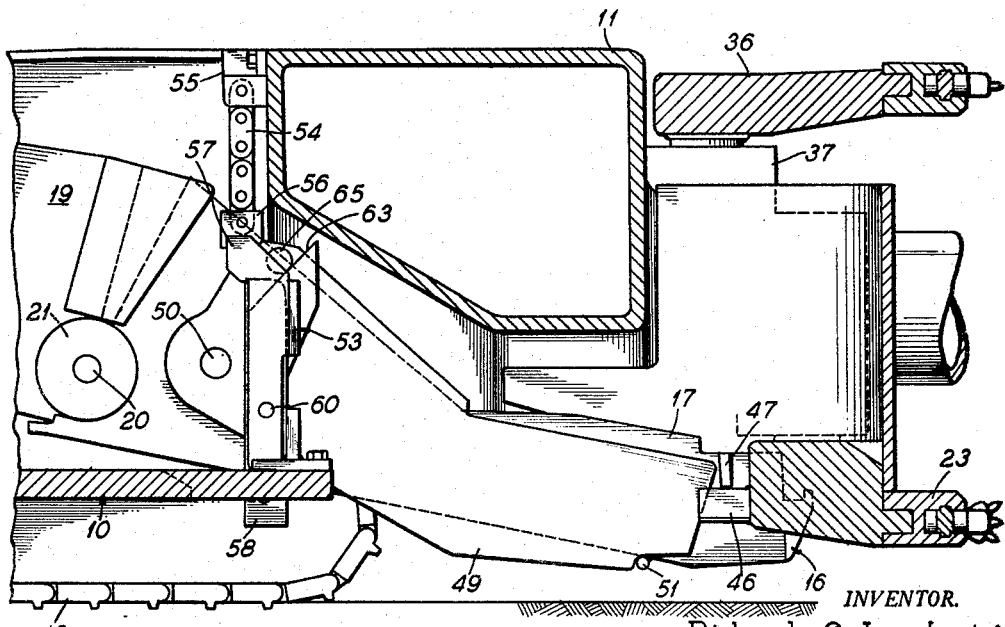
Figure 5 is a view somewhat similar to Figures 3 and 4, but showing the machine contracted for tramming.

The cam member 53 has an inclined cam face 63 at the upper end thereof and on the rear side thereof, which terminates into a vertical cam face 64 extending along the rear side thereof. The inclined cam face 63 engages a follower pin 65 extending outwardly from the adjustable side plate 49 adjacent the upper rear end thereof, when the associated adjustable side plate is in its lowermost position of adjustment, as shown in Figures 3 and 5.

Figure 4:
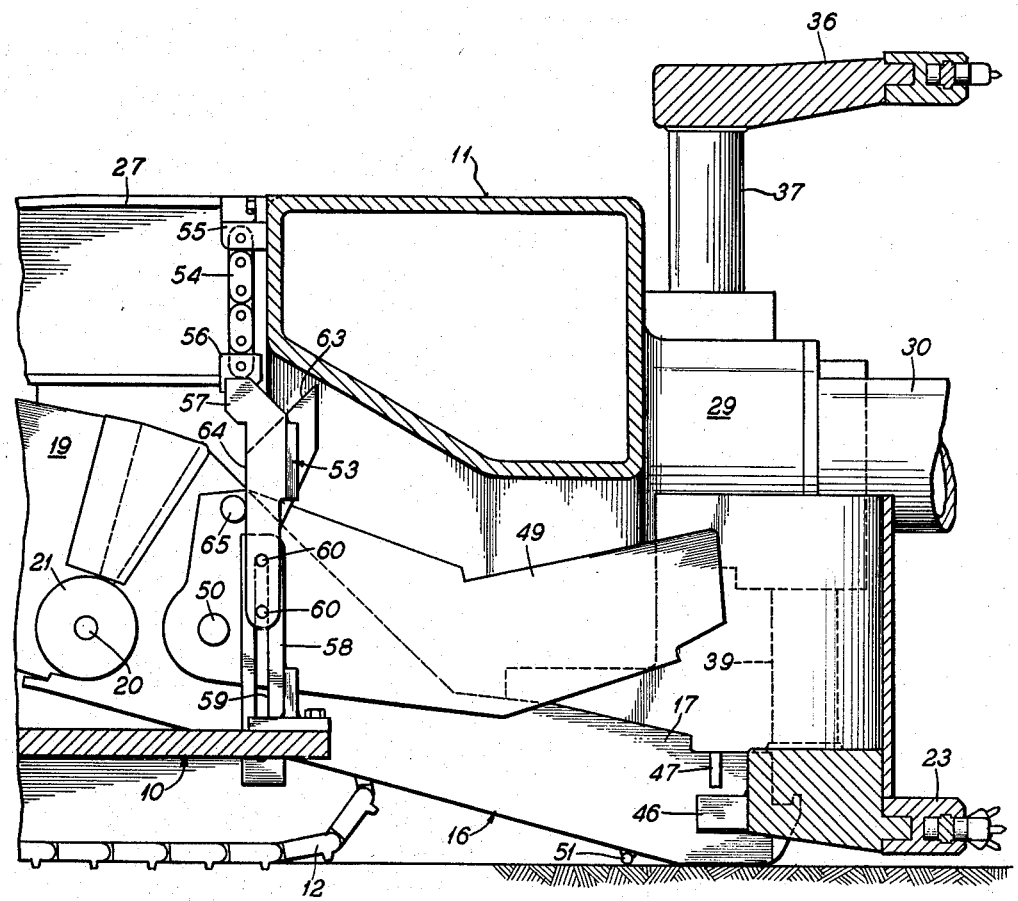
Figure 4 is a fragmentary longitudinal sectional view taken substantially along the same lines as Figure 3 and showing the machine adjusted for operation at a maximum working height.

As the cutter frame 11 is moved upwardly from the cutting position shown in Figure 3, to the cutting position shown in Figure 4, the inclined cam faces 63 engaging pins 65, will pivot the adjustable side plates 49 in an upward direction about the axis of the shafts 50 until the maximum position of vertical adjustment of said side plates is attained, at which time the cam faces 64 will engage the follower pins 65, retaining the side plates 49 in their maximum positions of vertical adjustment, as shown in Figure 4.

It may be seen from the foregoing that as the quantity of coal being mined increases, due to the adjustment of the cutter frame 11 to increase the working height of the machine, that the height of the side walls of the conveyor is automatically increased, to retain the coal on the conveyor, and that when the machine is operating in low working heights and the quantity of coal being mined is reduced and clearance between the side plates and cutter frame is correspondingly reduced, that the height of the side walls is reduced to accommodate a greater range of vertical adjustment of the machine without interference of the conveyor with the cutter frame and parts thereof.

While I have herein shown and described one form in which my invention may be embodied, it will be understood that I do not wish to be limited to the exact construction shown and described, but that various changes and modifications in the invention may be effected without departing from the spirit and scope of the novel concepts of the invention, as defined by the claims appended hereto.

I claim as my invention:

1. In a continuous mining machine of the boring type, a mobile main frame, a conveyor extending along said main frame and having an inclined trough section extending in advance of said main frame having parallel spaced side walls, a cutter frame having cutting means thereon, mounted in advance of said main frame and above said conveyor for vertical adjustable movement with respect thereto, to adjust the cutting height of the machine, means for increasing the height of the side walls of said conveyor upon adjustable movement of said cutter frame to increase the working height of the machine comprising adjustable side plates extending along opposite side walls of said inclined trough section, and operative connections between said cutter frame and said side plates for vertically moving said side plates in accordance with vertical movement of said cutter frame comprising individual cams for each side plate connected with said cutter frame and guided for rectilinear movement with said cutter frame.

2. In a continuous mining machine of a boring type, a mobile main frame, a conveyor extending along said main frame from the position in advance thereof and having an inclined trough section having parallel spaced side walls extending in advance of said main frame, a cutter frame having cutting means mounted thereon, mounted in advance of said main frame and above said conveyor, means supporting said cutter frame on said main frame and vertically adjusting said cutter frame with respect thereto, to adjust the cutting height of the machine, and means for increasing the height of the side walls of said conveyor upon adjustable movement of said cutter frame to increase the working height of the machine, comprising adjustable side plates extending along opposite sides of said inclined trough section and connected to the side walls thereof for vertical movement with respect thereto, and operative connections between said cutter frame and said side plates for vertically moving said side plates in accordance with vertical movement of said cutter frame comprising vertically extending guide means extending along each side of the conveyor, cam means guided in said guide means for vertical movement therealong, follower means on said side plates engageable with said cam means, and operative connections between said cutter frame and said cam means for vertically moving said cam means upon vertical adjustment of said cutter frame.

3. In a continuous mining machine of the boring type, a mobile main frame, a conveyor extending along said main frame and including an inclined trough section extending in advance of said main frame and having parallel spaced side walls, a cutter frame mounted in advance of said main frame and above said conveyor and having cutting means thereon, means for vertically adjusting said cutter frame with respect to said main frame to adjust the cutting height of the machine, and means for increasing the height of said side walls of said conveyor upon adjustable movement of said cutter frame to increase the working height of the machine comprising adjustable side plates extending along opposite side walls of said inclined trough section and pivotally connected thereto, vertically extending guide means extending along each of said adjustable side plates, cam members guided in said guide means for vertical movement therealong, said cam members each having an inclined camming face inclined outwardly and upwardly with respect to the pivot of the associated side plate and having a vertical camming face forming a downward continuation of said inclined camming face, a follower member on each side plate engageable with an associated camming face, and operative connections between said cutter frame and said cam members for vertically mounting said cam members to elevate said side plates upon vertical adjustment of said cutter frame.

4. In a continuous mining machine of the boring type, a mobile main frame, a conveyor extending along said main frame and including an inclined trough section extending in advance of said main frame for engagement with the ground and having spaced side walls, a cutter frame mounted in advance of said frame and extending across said conveyor, hydraulic jack means for mounting said cutter frame on said main frame and vertically adjusting cutter frame with respect thereto, to adjust the cutting height of the machine, cutting means carried by said cutter frame for boring contiguous bores in the working face including a plurality of boring heads, an upper cutter bar extended across said cutter frame for cutting the depending cusps between said boring heads and a lower cutter bar for cutting the upstanding cusps left between said boring heads, and means for increasing the height of the side walls of said conveyor upon adjustable movement of said cutter frame to increase the working height of the machine comprising guide members mounted on said lower cutter bar and extending upwardly therefrom along opposite sides of said inclined trough section, cam members guided in said guide members for vertical movement therealong, means connecting said cam members with said cutter frame for vertically moving said cam members with said cutter frame, adjustable side plates pivoted to the side walls of said inclined trough section adjacent the rear end thereof and extending forwardly therealong, and follower members on said side plates engageable with said cam means for effecting upward movement of said side plates upon upward movement of said cam members.

5. In a continuous mining of the boring type, a mobile main frame, a conveyor extending along said main frame and including an inclined trough section extending in advance of said main frame and having parallel spaced side walls, a cutter frame mounted in advance of said main frame and extending over the top of said conveyor hydraulic jack means mounting said cutter frame on said main frame and vertically adjusting said cutter frame with respect to said main frame, cutting means carried by said cutter frame comprising a plurality of boring heads for cutting contiguous bores in the mine face and upper and lower cutter bars for cutting the depending and upstanding cusps left between said boring heads, and means for increasing the height of said side walls of said conveyor upon adjustable movement of said cutter frame to increase the working height of the machine comprising adjustable side plates pivotally connected to side walls of said inclined trough section adjacent the rear end thereof and extending forwardly therealong, vertically extending guide members mounted on said cutter bar and extending upwardly therefrom along the outer sides of said side plates, cam members guided in said guide members for vertical movement therealong, said cam members each having an inclined camming face inclined outwardly and upwardly with respect to the pivots of said side plates and having a vertical camming face extending downwardly from said inclined camming face, operative connections between said cutter frame and said cam members for vertically moving said cam members upon vertical adjustment of said cutter frame, and followers on said adjustable side plates engageable with said camming faces for vertically moving said side plates upon vertical movement of said cam members by engagement of said followers with the inclined faces of said cam members and for maintaining said side plates in vertically extending relation with respect to said inclined trough section by engagement of said followers with the vertical faces of said cam members.

6. In a continuous mining machine of the boring type, a mobile main frame, a conveyor extending along said main frame and including an inclined elevating trough section extending from a position in advance of said main frame adjacent the ground and having parallel spaced side walls, a cutter frame mounted in advance of said main frame above said conveyor for vertical adjustable movement with respect thereto to adjust the cutting height of the machine, a pair of rotary boring heads carried by said cutter frame for cutting a plurality of contiguous bores in a mine face, and means for varying the height of the side walls of said conveyor upon adjustable movement of said cutter frame to vary the working height of the machine, to thereby correlate the material retaining capacity of the conveyor to the working height of the machine, comprising vertically adjustable side plates extending along opposite side walls of said inclined trough section, vertically guided cam means and cooperating follower means, one of said means having operative connection with said side plates and the other of said means having operative connection with said cutter frame to effect vertical movement of said side plates in accordance with vertical adjustment of said cutter frame.

References Cited in the file of this patent
UNITED STATES PATENTS

| | | |
|---|---|---|
| 2,715,527 | Cartlidge et al. | Aug. 16, 1955 |
| 2,719,709 | Salmons | Oct. 4, 1955 |
| 2,736,547 | Gonski | Feb. 28, 1956 |

UNITED STATES PATENT OFFICE

CERTIFICATE OF CORRECTION

Patent No. 2,957,686 October 25, 1960

Richard C. Lundquist

It is hereby certified that error appears in the printed specification of the above numbered patent requiring correction and that the said Letters Patent should read as corrected below.

Column 5, line 18, for "a", second occurrence, read -- the --; line 20, for "the" read -- a --; column 6, line 5, before "cutter" insert -- said --; line 27, after "mining" insert -- machine --.

Signed and sealed this 11th day of April 1961.

(SEAL)
Attest:

ERNEST W. SWIDER
Attesting Officer

ARTHUR W. CROCKER
Acting Commissioner of Patents